US009244325B2

(12) United States Patent
Hayashi et al.

(10) Patent No.: US 9,244,325 B2
(45) Date of Patent: Jan. 26, 2016

(54) DISPLAY SHEET, METHOD FOR PRODUCING DISPLAY SHEET, DISPLAY APPARATUS, AND ELECTRONIC DEVICE

(71) Applicant: SEIKO EPSON CORPORATION, Tokyo (JP)

(72) Inventors: Kenji Hayashi, Ageo (JP); Saichi Hirabayashi, Chino (JP); Daisuke Abe, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 146 days.

(21) Appl. No.: 13/873,971

(22) Filed: Apr. 30, 2013

(65) Prior Publication Data

US 2013/0293944 A1 Nov. 7, 2013

(30) Foreign Application Priority Data

May 7, 2012 (JP) .................................. 2012-106090

(51) Int. Cl.
  *G02B 26/00* (2006.01)
  *G02F 1/167* (2006.01)

(52) U.S. Cl.
  CPC ........ *G02F 1/167* (2013.01); *G02F 2001/1672* (2013.01); *G02F 2202/022* (2013.01); *G02F 2202/16* (2013.01)

(58) Field of Classification Search
  CPC ...................................................... G02F 1/167
  USPC ........................................................ 359/296
  See application file for complete search history.

(56) References Cited

U.S. PATENT DOCUMENTS

| 2003/0132898 A1* | 7/2003 | Akiba ............................. 345/63 |
| 2003/0231162 A1* | 12/2003 | Kishi ............................ 345/107 |
| 2011/0157682 A1* | 6/2011 | Zang et al. .................... 359/296 |
| 2011/0317249 A1* | 12/2011 | Komatsu ....................... 359/296 |
| 2012/0019896 A1 | 1/2012 | Yoshida et al. |
| 2012/0200910 A1* | 8/2012 | Hayashi ........................ 359/296 |

FOREIGN PATENT DOCUMENTS

| JP | A-2006-323022 | 11/2006 |
| JP | A-2009-223080 | 10/2009 |
| JP | A-2011-154202 | 8/2011 |
| JP | A-2011-167924 | 9/2011 |
| JP | A-2011-221449 | 11/2011 |
| JP | A-2012-027163 | 2/2012 |
| WO | WO 2006/123810 A1 | 11/2006 |

OTHER PUBLICATIONS

Indian Journal of Chemical Technology, vol. 6, Jul. 1999, pp. 219-224.*

* cited by examiner

*Primary Examiner* — James Jones
(74) *Attorney, Agent, or Firm* — Oliff PLC

(57) ABSTRACT

A display sheet has a display layer, a first electrode on one side of the display layer, a second electrode on another side of the display layer, and an electrode protection layer between the display layer and the first electrode. The display layer has a partition structure dividing the display layer into a plurality of regions and a liquid dispersion filling the individual regions. The electrode protection layer and the partition structure are integrally formed and both mainly composed of an electroconductive polymer.

18 Claims, 11 Drawing Sheets

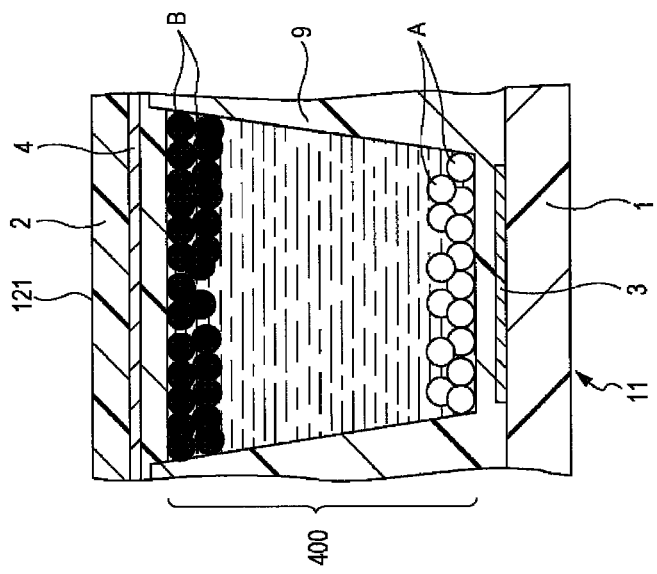
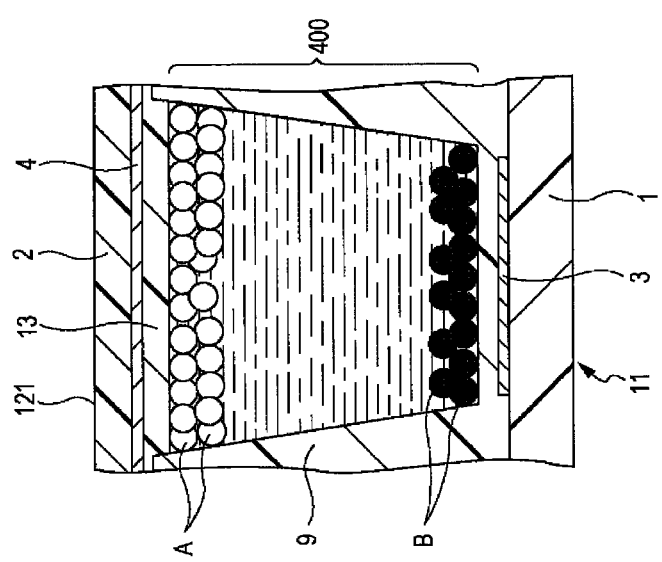

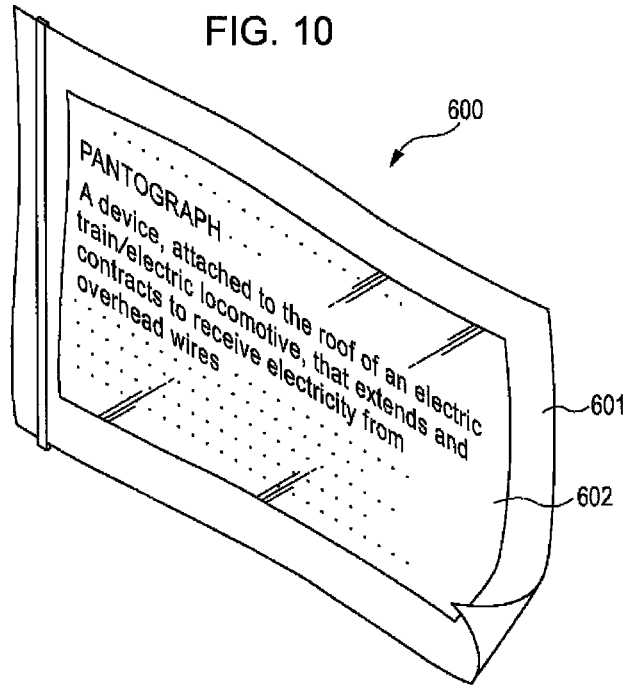

DISPLAY SHEET, METHOD FOR PRODUCING DISPLAY SHEET, DISPLAY APPARATUS, AND ELECTRONIC DEVICE

BACKGROUND

1. Technical Field

The present invention relates to a display sheet, a method for producing a display sheet, a display apparatus, and an electronic device.

2. Related Art

Electrophoretic display apparatuses, which are display apparatuses using the electrophoresis of particles, have hitherto been known (e.g., see JP-A-2012-27163). Electrophoretic display apparatuses are superior to other types in portability and low power consumption. The electrophoretic display disclosed in JP-A-2012-27163 has a pair of opposing substrates (electrodes) and a display layer between them. The display layer is divided by a partition structure into a plurality of cells, and each cell is filled with a liquid dispersion of electrophoretic particles in a dispersion medium.

The electrophoretic display apparatus disclosed in the aforementioned publication, in which the electrodes are in contact with the liquid dispersion, may be lacking in durability (may become less reliable) owing to corrosive degradation of the electrodes. A countermeasure against this is to cover the surface of the electrodes with protective layers to isolate the electrodes from the liquid dispersion and thereby ensure the durability (reliability) of the apparatus. However, placing such protective layers between the twin electrodes with the cells sandwiched may affect the voltage between the electrodes, leading to reduced display characteristics. The known electrophoretic display apparatuses are therefore unsatisfactory either in durability or display characteristics.

SUMMARY

An advantage of some aspects of the invention is that they provide a display sheet having excellent durability and display characteristics, a method for producing such a display sheet, a similarly advantageous display apparatus, and a highly reliable electronic device.

The following describes some aspects of the invention.

A display sheet according to an aspect of the invention has:

a display layer;

a first electrode on one side of the display layer;

a second electrode on another side of the display layer; and an electrode protection layer between the display layer and the first electrode. The display layer has a partition structure dividing the display layer into a plurality of regions and a liquid dispersion. The liquid dispersion contains at least one positively or negatively charged particulate material in a dispersion medium and fills the individual regions of the display layer. The electrode protection layer and the partition structure are integrally formed and both mainly composed of an electroconductive polymer.

Using an electroconductive polymer as the main ingredient of the electrode protection layer leads to a low resistivity of the electrode protection layer and thus is effective in preventing the voltage drops between the first and second electrodes. The first and second electrodes can thus efficiently generate an electric field therebetween, and the electric field can be applied to the individual regions of the display layer in a reliable and efficient manner. The display sheet therefore has excellent display characteristics.

Furthermore, the electrode protection layer isolates the first electrode from the liquid dispersion, thereby protecting the first electrode from corrosive degradation. The display sheet is therefore highly durable. There is no risk that the liquid dispersion could reach the first electrode through a gap between the partition structure and the electrode protection layer since these two components are integrally formed.

In a preferred embodiment of the display sheet according to this aspect of the invention, the electroconductive polymer is an ultraviolet-curable polymer having an ethylene oxide side chain.

This ensures that the electrode protection layer and the partition structure have excellent electroconductivity, stability upon exposure to dispersion media, and pressure resistance.

In another preferred embodiment of the display sheet according to this aspect of the invention, the ethylene oxide side chain is a group represented by a chemical formula $(CH_2-CH_2-O-)_n-$ where the subscript n is an integer of 2 to 20.

This ensures that the electrode protection layer and the partition structure have low resistivity values.

In another preferred embodiment of this aspect of the invention, the display sheet further has an adhesive layer between the display layer and the second electrode.

The adhesive layer firmly joins the partition structure to the second electrode.

In another preferred embodiment of the display sheet according to this aspect of the invention, a distal end portion of the partition structure is embedded in the adhesive layer.

This further reinforces the adhesion of the partition structure to the second electrode.

In another preferred embodiment of the display sheet according to this aspect of the invention, the adhesive layer is made of a thermoplastic material.

This ensures that the distal end portion of the partition structure can be easily embedded in the adhesive layer by pressing the partition structure against the adhesive layer since the adhesive layer can be softened in advance.

In another preferred embodiment of the display sheet according to this aspect of the invention, the partition structure is tapered, getting narrower toward a distal end thereof.

This increases the aperture ratio of the display surface without affecting the strength of the partition structure.

A method for producing a display sheet according to another aspect of the invention is one for a display sheet having a display layer, a first electrode on one side of the display layer, and a second electrode on another side of the display layer. This method includes:

forming a resin layer mainly composed of an electroconductive polymer on the first electrode;

forming a plurality of depressions in the resin layer to integrally form a partition structure separating a plurality of regions and an electrode protection layer covering the first electrode;

filling each of the plurality of regions with a liquid dispersion of at least one positively or negatively charged particulate material in a dispersion medium; and forming the second electrode above the partition structure to seal the depressions.

By this method it is easy to produce a display sheet with excellent durability and display characteristics.

In a preferred embodiment of the method for producing a display sheet according to this aspect of the invention, the partition structure and the electrode protection layer are formed by pressing a die having a plurality of projections against the resin layer.

This makes it easier to integrally form the partition structure and the electrode protection layer.

In a preferred embodiment of the method for producing a display sheet according to this aspect of the invention, the partition structure and the second electrode are joined using an adhesive layer.

The adhesive layer firmly joins the partition structure to the second electrode.

In a preferred embodiment of the method for producing a display sheet according to this aspect of the invention, the partition structure and the second electrode are joined by pressing the partition structure against the adhesive layer to stick a distal end portion of the partition structure into the adhesive layer.

This further reinforces the adhesion of the partition structure to the second electrode.

In a preferred embodiment of the method for producing a display sheet according to this aspect of the invention, the adhesive layer is softened in advance.

This makes it easier to stick the distal end portion of the partition structure into the adhesive layer.

A display apparatus according to another aspect of the invention has a display sheet according to the above aspect of the invention.

The display sheet provides the display apparatus with excellent reliability.

An electronic device according to another aspect of the invention has a display apparatus according to the above aspect of the invention.

The display apparatus provides the electronic device with excellent reliability.

BRIEF DESCRIPTION OF THE DRAWINGS

The invention will be described with reference to the accompanying drawings, wherein like numbers reference like elements.

FIGS. 4A and 4B are cross-sectional diagrams used to describe the operation of the display apparatus illustrated in FIG. 1.

FIG. 10 is a perspective diagram illustrating an electronic paper display as an embodiment of the electronic device according to an aspect of the invention.

DESCRIPTION OF EXEMPLARY EMBODIMENTS

The following details the display sheet, the method for producing a display sheet, the display apparatus, and the electronic device according to aspects of the invention by providing preferred embodiments thereof with reference to the attached drawings.

Display Apparatuses

The following describes display apparatuses incorporating a display sheet according to an aspect of the invention.

Embodiment 1

Figure 1:
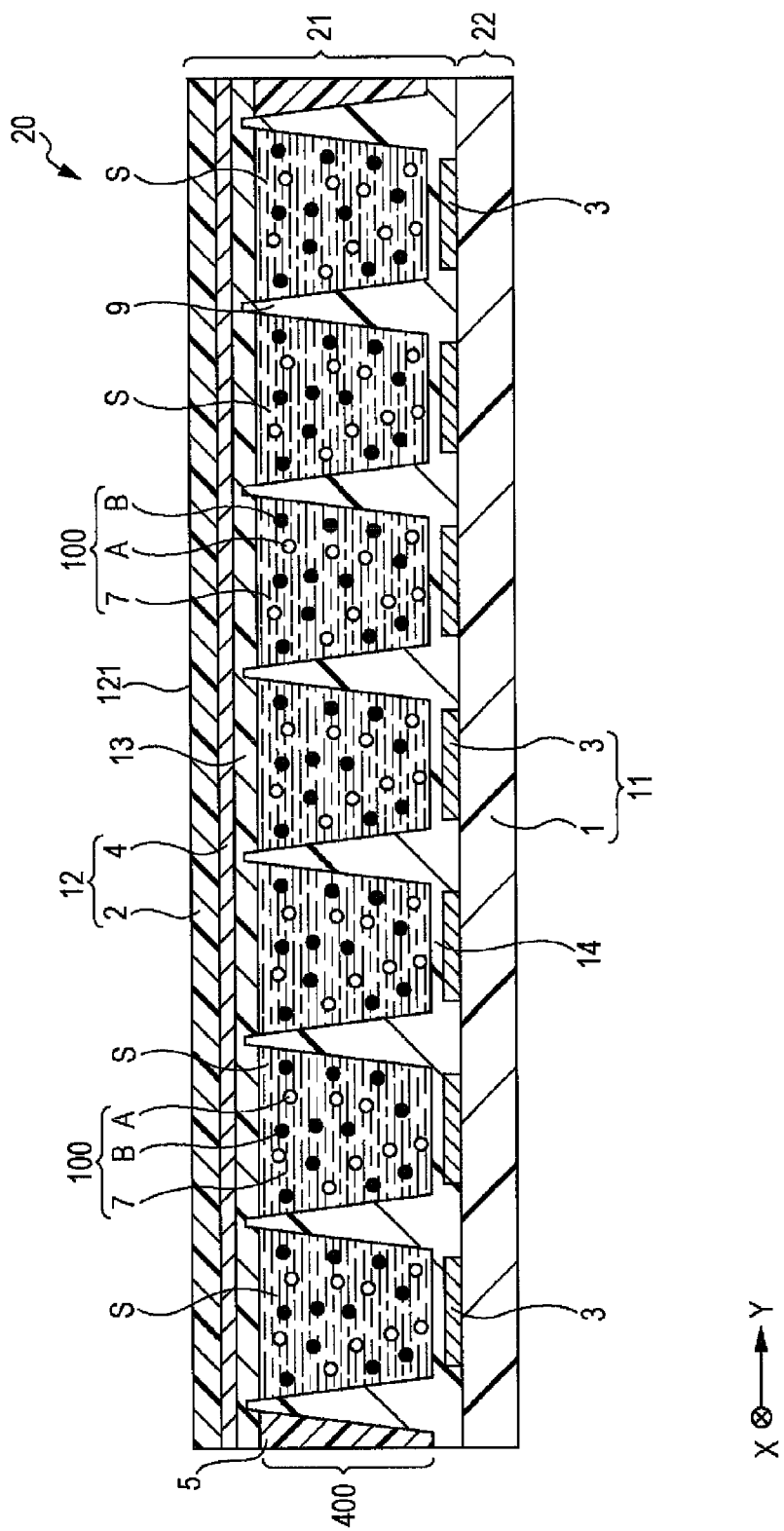
FIG. 1 is a cross-sectional diagram illustrating Embodiment 1 of a display apparatus according to an aspect of the invention.
Figure 2:
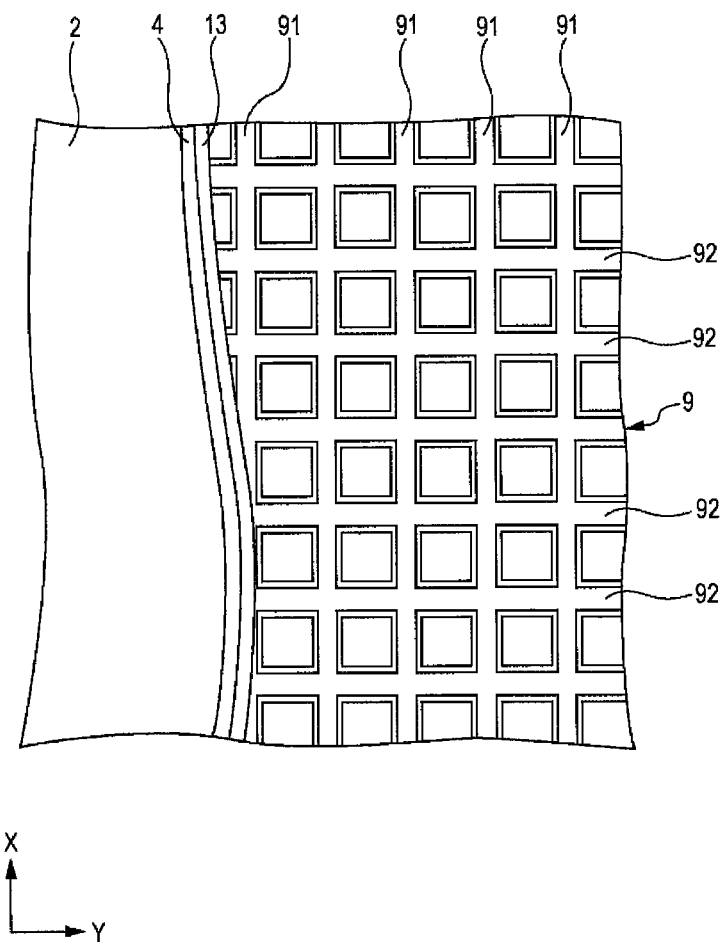
FIG. 2 is a plan view (top view) of the display apparatus illustrated in FIG. 1.
Figure 3:
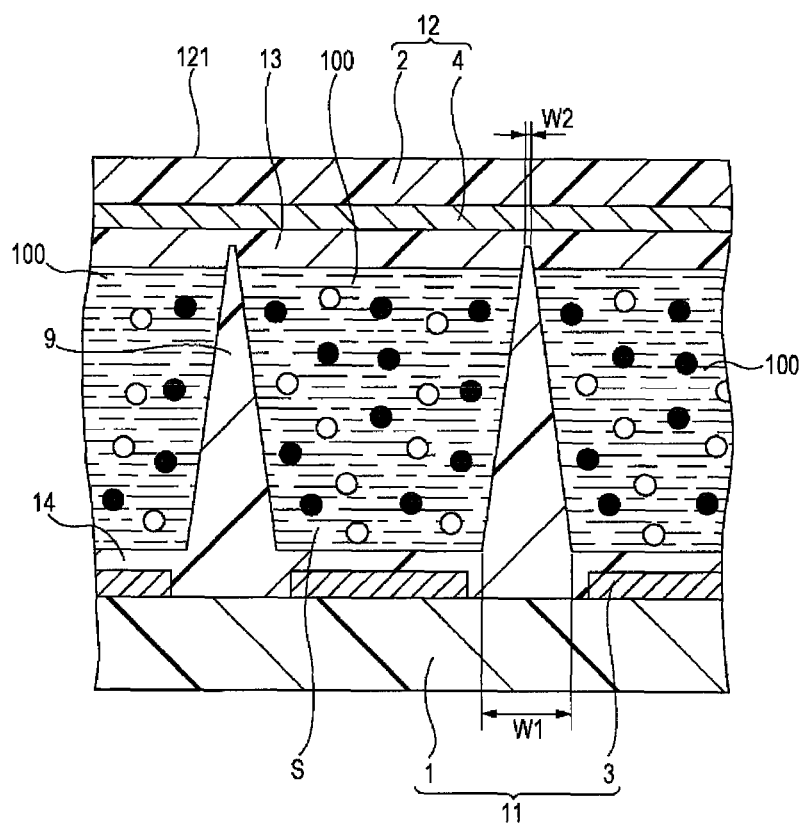
FIG. 3 is an enlarged partial cross-sectional view of the display apparatus illustrated in FIG. 1.

FIG. 1 is a cross-sectional diagram illustrating Embodiment 1 of a display apparatus according to an aspect of the invention. FIG. 2 is a plan view (top view) of the display apparatus illustrated in FIG. 1. FIG. 3 is an enlarged partial cross-sectional view of the display apparatus illustrated in FIG. 1. FIGS. 4A and 4B are cross-sectional diagrams used to describe the operation of the display apparatus illustrated in FIG. 1. FIGS. 5A and 5B, 6A to 6C, and 7A to 7C are cross-sectional diagrams used to describe a method for producing the display apparatus illustrated in FIG. 1. For convenience of explanation, the upper and lower sides in FIG. 1 are hereinafter referred to as the top and the bottom, respectively. Furthermore, the two horizontal directions perpendicular to each other are defined as the X-direction and the Y-direction as illustrated in FIG. 2. This convention also applies to the other drawings.

The display apparatus (a display apparatus according to an aspect of the invention) 20 illustrated in FIG. 1 is an electrophoretic display apparatus, which uses migration of particles to show desired images. This display apparatus 20 has a display sheet (located in the front of the apparatus, or frontplane) 21 and a circuit substrate (backplane) 22.

As illustrated in FIG. 1, the display sheet 21 has the following components: a substrate 12 having a flat-plate base 2 and a second electrode 4 on the bottom surface of the base 2; a display layer 400 between the substrate 12 and the circuit substrate 22; an adhesive layer 13 between the substrate 12 and the display layer 400; and an electrode protection layer 14 between the display layer 400 and the circuit substrate 22. The top surface of the substrate 12 serves as the display surface 121 of the display sheet 21.

The display layer 400 has a grid-shaped partition structure 9 and a liquid dispersion 100 filling the individual sections S separated by the partition structure 9. The liquid dispersion 100 contains negatively charged particles (electrophoretic particles; a first particulate material A) and positively charged particles (electrophoretic particles; a second particulate material B) different in hue from the first particulate material A in a dispersion medium 7.

The circuit substrate 22 has the following components: an opposite substrate 11 having a flat-plate base 1 and a plurality of segments of a first electrode 3 on the top surface of the base 1; and a circuit (not illustrated) provided to this opposite substrate 11. This circuit can have, among others, the following components: a matrix of TFTs (switching elements), gate and data lines corresponding to the TFTs, a gate driver for supplying the gate lines with a desired amount of voltage, a data driver for supplying the data lines with a desired amount of voltage, and a control unit that controls the operation of the gate and data drivers.

The following describes the constitution of the individual components.

The base 1 and the base 2 are sheet-shaped (flat-plate) components that support and protect the components interposed therebetween. Although each of the bases 1 and 2 may be rigid or flexible, they are preferably flexible. When the bases 1 and 2 have flexibility, the display apparatus 20 also has flexibility and thus the display apparatus 20 is useful as a component of an electronic paper display, for example.

When flexible components are used as the bases 1 and 2, examples of materials that can be used include highly transparent glass and resins. Examples of suitable resins include polyesters such as PET (polyethylene terephthalate) and PEN (polyethylene naphthalate), polyolefins such as polyethylene, modified polyolefins, polyamides, thermoplastic polyimides, polyethers, polyether ether ketones, and thermoplastic elastomers such as thermoplastic polyurethanes and chlorinated polyethylene as well as copolymers, blends, polymer alloys, and other derivatives mainly composed of such resins. One or a mixture of two or more of such materials can be used.

The average thickness of each of the bases 1 and 2 depends on the material of that base, the purpose of use of the apparatus, and other conditions and is not limited to any particular range. When flexible bases are used, their average thickness is preferably on the order of 20 μm to 500 μm, both inclusive, more preferably on the order of 25 μm to 250 μm, both inclusive. This makes the display apparatus 20 smaller in size (in particular, thickness) without affecting the flexibility and strength of the display apparatus 20.

The surfaces on the display layer 400 side of these bases 1 and 2, i.e., the top surface of the base 1 and the bottom surface of the base 2, have coating-like first and second electrodes 3 and 4, respectively. In this embodiment, the second electrode 4 serves as a common electrode, while the first electrode 3 is divided into a matrix of separate electrodes (pixel electrodes connected to the TFTs) arranged in the X- and Y-directions. In the display apparatus 20, a region where one segment of the first electrode 3 overlaps with the second electrode 4 serves as one pixel.

The electrodes 3 and 4 can be made of any substantially electroconductive material. Examples of materials that can be used include metallic materials such as gold, silver, copper, aluminum, and alloys of such metals, carbon materials such as carbon black, graphene, carbon nanotubes, and fullerenes, and various classes of electroconductive materials including electron-conducting polymers such as polyacetylene, polyfluorene, polythiophene, and their derivatives, ion-conducting polymers obtained by dispersing an ionic substance such as NaCl or $Cu(CF_3SO_3)_2$ in a resin matrix based on polyvinyl alcohol, polycarbonate, or a similar polymer, and electroconductive oxides such as indium oxide (IO), indium tin oxide (ITO), fluorine-doped tin oxide (FTO), and zinc oxide. One or a combination of two or more of such materials can be used.

The average thickness of each of the electrodes 3 and 4, which depends on the material of that electrode, the purpose of use of the apparatus, and other conditions, can be on the order of 10 nm to 100 nm, both inclusive, for example.

Those base and electrode of the bases 1 and 2 and the electrodes 3 and 4 that are on the display surface 121 side are permeable to light, i.e., substantially transparent (colorless and transparent, colored and transparent, or translucent). In this embodiment, the top surface of the substrate 12 serves as the display surface 121, and thus at least the base 2 and the second electrode 4 are substantially transparent. This allows the image shown by the display apparatus 20 to be easily seen from the display surface 121 side.

The substrate 12 and the opposite substrate 11 have a seal 5 therebetween which extends along the edge portion of the substrates. This seal 5 keeps the display layer 400 airtight. As a result, the display apparatus 20 is protected from moisture infiltration, making the display characteristics of the display apparatus 20 more durable.

The seal 5 can be made of any material. Examples of materials that can be used include thermoplastic resins such as acrylic resins, urethane resins, and olefin polymers, thermosetting resins such as epoxy resins, melamine resins, and phenolic resins, and other types of resins. One or a combination of two or more of such materials can be used.

The bottom surface of the substrate 12 has an adhesive layer 13. The adhesive layer 13 is substantially colorless and transparent as with the base 2 and the second electrode 4.

The adhesive layer 13, configured in such a way, joins the partition structure 9 and the substrate 12. The adhesive layer 13 also isolates the second electrode 4 from the dispersion medium 7, thereby protecting the second electrode 4 from corrosive degradation. Another function of this layer is to isolate the second electrode 4 from the first and second particulate materials A and B and thereby to prevent the first and second particulate materials A and B from adhering to the second electrode 4.

The adhesive layer 13 is preferably made of an adhesive and thermoplastic material. Some examples of such materials are thermoplastic resins including urethane resins, urea resins, ester resins, ether resins, olefin polymers such as polyethylene and polypropylene, ethylene polymers such as ethylene-vinyl acetate copolymers (EVA), ethylene-methyl methacrylate copolymers (EMMA), and ethylene-cyclic olefin copolymers (COC resins), acrylic resins, and butadiene elastomers.

It is allowed to add a thermosetting material such as an epoxy compound, an isocyanate, a cyanoacrylate, a silane coupling agent, a melamine compound, or a phenolic compound to any such thermoplastic resin in order to improve the heat resistance of the adhesive layer 13. It is also possible to mix fiber-shaped or granular fine particles in a thermoplastic resin. This results in fine projections and depressions being formed in the bottom surface of the adhesive layer 13 (the surface bordering the display layer 400), thereby leading to an increased surface area when compared to an even surface. The retention of the first and second particle materials A and B is accordingly improved, and the first and second particulate materials A and B become able to form thick deposits. As a result, higher-contrast images become available.

Likewise, it is allowed to use a thermoplastic resin modified with ethylene oxide, a sulfonic acid, or a similar functional group so that the resistivity of the adhesive layer 13 will be low. The lower the resistivity of the adhesive layer 13, the more effectively the voltage drops between the electrodes 3 and 4 can be prevented. The resistivity of the adhesive layer 13 is preferably lower than that of the partition structure 9 and more preferably one or more orders of magnitude lower than that of the partition structure 9.

As is also mentioned later in the description of a production method, a process for producing the display apparatus 20 may include pressing the partition structure 9 against the adhesive layer 13, which is softened in advance, with the distal end portion thereof to stick the distal end portion of the partition structure 9 into the adhesive layer 13. Such an operation can be done smoothly and successfully when the softening temperature (Vicat softening point) of the adhesive layer 13 is on the order of 50° C. to 120° C., both inclusive, for example. Preferably, the softening point of the adhesive layer 13 is lower than the boiling point of the dispersion medium 7, more preferably lower than the boiling point of the dispersion medium 7 by at least 20° C. This effectively prevents the dispersion medium 7 from being evaporated by the heat applied to soften the adhesive layer 13 during the production of the display apparatus 20.

Preferably, the adhesive layer 13 is softer than the partition structure 9 in order that the partition structure 9 can be prevented from being deformed during such an operation. This means that the adhesive layer 13 is preferably made of a material with a Young's modulus lower than that of the material of the partition structure 9. The Young's modulus of the material of the adhesive layer 13 is not limited to any particular range, and its preferred range depends on what material is used to make the partition structure 9. The Young's modulus of the material of this layer is preferably on the order of 0.01 MPa to 500 MPa, both inclusive, for example.

The average thickness of the adhesive layer 13 is not limited to any particular range; preferably, it is on the order of 1 μm to 10 μm, both inclusive. This allows the distal end portion of the partition structure 9 to stick into the adhesive layer 13 deeply enough so that the adhesive layer 13 and the partition structure 9 can be firmly attached together. Furthermore, such a small thickness of the adhesive layer 13 prevents the voltage drops between the electrodes 3 and 4, thereby preventing the retention of the first and second particulate materials A and B from being affected.

The top surface of the opposite substrate 11 has an electrode protection layer 14.

This electrode protection layer 14 has two functions: isolating the first electrode 3 from the dispersion medium 7 to protect the first electrode 3 from corrosive degradation, and isolating the first electrode 3 from the first and second particulate materials A and B to prevent the first and second particulate materials A and B from adhering to the first electrode 3. The electrode protection layer 14, configured in such a way, is formed integrally with the partition structure 9.

Furthermore, this electrode protection layer 14 contains an electroconductive polymer, i.e., a polymer that can conduct electricity, as the main ingredient and thus has a resistivity lower than those of electrode protection layers made of non-electroconductive resins. This low resistivity of the electrode protection layer 14 is effective in preventing the voltage drops between the electrodes 3 and 4 and does not affect the functions of this layer such as the aforementioned ones.

More specifically, the resistivity of the electrode protection layer 14 is preferably on the order of $1 \times 10^8$ Ω·cm to $1 \times 10^{12}$ Ω·cm, both inclusive, more preferably on the order of $2 \times 10^{10}$ Ω·cm to $5 \times 10$ Ω·cm, both inclusive, although not limited to any particular range. It is also preferred that the resistivity of the electrode protection layer 14 and that of the dispersion medium 7 are on the same order of magnitude. These preferred conditions enhance the functions of the electrode protection layer 14 such as the aforementioned ones.

The thickness of the electrode protection layer 14 is not limited to any particular range; preferably, it is on the order of 0.01 μm to 5 μm, both inclusive, more preferably on the order of 0.1 μm to 2 μm, both inclusive. This allows the electrode protection layer 14 to fully accomplish the aforementioned functions. Furthermore, such a small thickness of this layer helps to prevent the voltage drops between the electrodes 3 and 4.

The electrode protection layer 14 is mainly composed of an electroconductive polymer, i.e., a polymer that can conduct electricity.

This electroconductive polymer can be of any kind. Examples of polymers that can be used include polyacetylene, poly(p-phenylene vinylene), polypyrrole, polythiophene, polyaniline, polyp-phenylene sulfide), and similar polymers as well as ultraviolet-curable polymers modified with ion-conducting side chains (functional groups), such as acrylic resins, epoxy resins, urethane resins, ester resins, olefin polymers, cyclic olefin copolymers (COC resins), and butadiene elastomers having an ethylene oxide or sulfonic acid side chain. One or a combination of two or more of such polymers can be used.

Among others, ultraviolet-curable polymers having an ethylene oxide side chain (an electroconductive group) are preferred. Using this type of polymer makes it easier to integrally form the electrode protection layer 14 and the partition structure 9. Using such a polymer also ensures that the electrode protection layer 14 will be composed of three-dimensionally cross-linked chains of a polymer (resin) addition-polymerized with ethylene oxide and that the electrode protection layer 14 and the partition structure 9 will thus have excellent electroconductivity, stability upon exposure to dispersion media, and pressure resistance. Furthermore, the generation of ions in the electrode protection layer 14 is effectively reduced or prevented during the conduction of electricity through this layer. Using the aforementioned type of polymer will therefore prevent leakage of ions into the liquid dispersion 100 and the associated alteration and degradation of the liquid dispersion 100.

The ethylene oxide side chain is preferably a polyether group represented by a chemical formula $(CH_2—CH_2—O—)_n$— where the subscript n is an integer of 2 to 20, more preferably an integer of 5 to 15. Species with an n less than 2 or exceeding 20 are not preferred because in the former case the resistivity-reducing effect of the ethylene oxide group will be insufficient and in the latter case the material will be so viscous that some problems will occur during the partition structure formation. An ethylene oxide group satisfying the above preferred condition ensures that the resistivity of the electrode protection layer 14 will be low. Furthermore, the process for producing the display apparatus 20 described later herein includes preparing an ultraviolet-curable resin composition as a precursor of an ultraviolet-curable resin layer, and monomers having such a preferred ethylene oxide group are soluble in the solvent used to prepare this composition.

For this purpose various kinds of ultraviolet-curable polymers made from monomers with different functional groups can be used, including such polymers as listed above, i.e., acrylic resins, epoxy resins, urethane resins, ester resins, olefin polymers, cyclic olefin copolymers (COC resins), and butadiene elastomers.

When the electrode protection layer 14 is formed from an ultraviolet-curable acrylic resin, for example, the resin can be a three-dimensionally cross-linked copolymer prepared by radical polymerization of two monomers. One of the monomers has no ethylene oxide group (the first monomer), while the other has an ethylene oxide group (the second monomer), and a radical polymerization initiator is used to combine the two monomers.

Examples of monomers that can be used as the first monomer include methyl acrylate and methyl methacrylate, and one or a combination of two or more of such monomers can be used. Examples of monomers that can be used as the second monomer include polyethylene glycol monoacrylate, polyethylene glycol monomethacrylate, methoxypolyethylene glycol acrylate, methoxypolyethylene glycol methacrylate, phenoxypolyethylene glycol methacrylate, phenoxypolyethylene glycol polypropylene glycol methacrylate, and octoxypolyethylene glycol polypropylene glycol methacrylate, and one or a combination of two or more of such monomers can be used.

In this case the resistivity of the electrode protection layer 14 depends on the proportions of these first and second monomers and thus can be easily adjusted to fall within the aforementioned preferred range by using the two monomers in appropriate proportions.

When the electrode protection layer 14 is formed from an ultraviolet-curable epoxy resin, for example, the resin can be a three-dimensionally cross-linked copolymer prepared by cationic polymerization of two monomers. One of the monomers has no ethylene oxide group (the third monomer), while the other has an ethylene oxide group (the fourth monomer), and a cationic polymerization initiator is used to combine the two monomers.

Examples of monomers that can be used as the third monomer include diglycidyl ethers of bisphenol A, diglycidyl ethers of bisphenol F, polyfunctional alicyclic epoxy compounds, and epoxy-modified polybutadiene, and one or a combination of two or more of such monomers can be used. Examples of monomers that can be used as the fourth monomer include polyethylene glycol diglycidyl ether, polyethylene glycol glycidyl ether, ethylene oxide adducts of phenol glycidyl ether, and ethylene oxide adducts of lauryl alcohol glycidyl ether, and one or a combination of two or more of such monomers can be used.

In this case the resistivity of the electrode protection layer 14 depends on the proportions of these third and fourth monomers and thus can be easily adjusted to fall within the aforementioned preferred range by using the two monomers in appropriate proportions.

Besides the electroconductive polymer, the electrode protection layer 14 may further contain an inorganic filler. This improves the heat resistance and hardness of the electrode protection layer 14.

Examples of inorganic fillers that can be used include fused silica, spherical silica, crystalline silica, and various forms of alumina, and one or a combination of two or more of such fillers can be used.

As illustrated in FIG. 1, the display layer 400 has a grid-shaped partition structure 9 and a liquid dispersion 100 filling the individual sections S separated by the partition structure 9. Although in this drawing the segments of the first electrode 3 correspond to the sections S on a one-by-one basis, the number of segments of the first electrode 3 per section S is not limited to one; it may be two or more.

The partition structure 9 is formed on the top surface of the opposite substrate 11 integrally with the electrode protection layer 14 and is mainly composed of an electroconductive polymer, i.e., a polymer that can conduct electricity, as with the electrode protection layer 14.

In a plan view of the display layer 400, this partition structure 9 has first partition walls 91 extending in the X-direction and equally spaced in the Y-direction, which is perpendicular to the X-direction, and second partition walls 92 extending in the Y-direction and equally spaced in the X-direction, as illustrated in FIG. 2; the two series of partition walls cross at right angles.

As illustrated in FIG. 3, the first partition walls 91 are formed integrally with the electrode protection layer 14, rising from the surface of the opposite substrate 11 toward the substrate 12 side. Their distal end portion, which is on the side opposite to the electrode protection layer 14, is embedded in the adhesive layer 13. This increases the area of contact between the first partition walls 91 and the adhesive layer 13 (the area where these components are in contact) and allows the first partition walls 91 to be firmly attached to the adhesive layer 13.

The first partition walls 91 are tapered, getting narrower toward the substrate 12 side. In other words, each first partition wall 91 is wider in the proximal end portion and narrower in the distal end portion. Such a tapered shape of the first partition walls 91 increases the aperture ratio of the display surface 121 without affecting the mechanical strength of the first partition walls 91.

Preferably, the proximal width W1 and the distal width W2 of the first partition walls 91 satisfy the relation $2 \times W2 \leq W1 \leq 4 \times W2$. In addition to enhancing the aforementioned effects, this ensures that the first partition walls 91 are not too thick, thereby preventing the individual sections S from being so large that the resolution of the apparatus is insufficient.

The smaller the distal width W2 is, the higher the aperture ratio of the display surface 121 is and the easier it is to stick the distal end portion of the partition structure 9 into the adhesive layer 13 in the production process described later herein. The width W2 is preferably on the order of 1 µm to 5 µm, both inclusive, although not limited to any particular range.

The height of the first partition walls 91 is not limited to any particular range; preferably, it is on the order of 5 µm to 50 µm, both inclusive, for example. This limits the distance of migration of the first and second particulate materials A and B while ensuring that the first and second particulate materials A and B can also be masked. As a result, higher-contract images become available while a high response rate is maintained. The aspect ratio of the first partition walls 91 (the ratio of their height to their width) is preferably on the order of 1 to 50, although not limited to any particular range.

The partition structure 9, configured in such a way, is preferably harder than the adhesive layer 13. In other words, the partition structure 9 is preferably made of a material with a Young's modulus higher than that of the material of the adhesive layer 13. This prevents the partition structure 9 from accidental deformation during the production of the display apparatus 20 and allows the partition structure 9 to be more firmly attached to the adhesive layer 13. The Young's modulus of the material of the partition structure 9 is not limited to any particular range, and its preferred range depends on what material is used to make the adhesive layer 13. Preferably, the Young's modulus of the material of this structure is on the order of 500 MPa to 10 GPa, both inclusive, for example. Note that in aspects of the invention the partition structure 9 is formed integrally with the electrode protection layer 14; thus, the Young's modulus of the material of the partition structure 9 can be easily adjusted to fall within this preferred range by adding an inorganic filler (described earlier herein) to the material of the partition structure 9 (and the electrode protection layer 14) since the amount of the inorganic filler determines the Young's modulus of the material of the partition structure 9.

The individual sections S defined by the partition structure 9 configured in such a way are filled with a liquid dispersion 100. The liquid dispersion 100 contains negatively charged particles (a first particulate material A) and positively charged particles (a second particulate material B) different in hue from the first particulate material A in a dispersion medium 7. The first and second particulate materials A and B can be of any color (hue); it is possible to use any combination of two colors selected from achromatic colors such as white, black, and gray and chromatic colors such as red, blue, and green. For example, black and white images can be shown when either the first or second particulate material A or B is white and the other is black.

Each of the first and second particulate materials A and B can be of any material composed of particles with an electric charge. Examples of materials that can be used include particles of the following substances: titanium oxide, zinc oxide, iron oxide, chromium oxide, zirconium oxide, and similar oxides; silicon nitride, titanium nitride, and similar nitrides; zinc sulfide and similar sulfides; titanium boride and similar borides; strontium chromate, cobalt aluminate, copper chromite, ultramarine, and similar inorganic pigments; and azo, quinacridone, anthraquinone, dioxazine, perylene, and similar organic pigments. It is also possible to use complex particles formed of particles of an acrylic resin, a urethane resin, a urea resin, an epoxy resin, polystyrene, polyester, or any other resin or polymer and a pigment coating.

The average particle diameter of each of the first and second particulate materials A and B is not limited to any particular range; preferably, it is on the order of 200 nm to 300 nm, both inclusive. Particles with an average diameter less than 200 nm may cause a lack of chromaticity and a reduced contrast and lead to unclear images to be displayed. On the other hand, particles with an average diameter exceeding 300 nm require a darker color than smaller ones to produce the same color on a displayed image and thus may cause an increase in the amount of pigment or any other colorant required. With such a large average diameter, furthermore, the first and second particulate materials A and B may fail to quickly migrate, leading to a reduced response rate.

Note that the average diameters of the first and second particulate materials A and B are volume-average particle diameters measured using a dynamic light scattering particle size analyzer (e.g., Horiba LB-500 [trade name]).

Materials suitable for use as the dispersion medium 7 include those that have a boiling point of 150° C. or higher, are unlikely to evaporate, and have relatively high electrical insulation properties. Examples of substances suitable for use as the dispersion medium 7 include the following: alcohols such as butanol and glycerol; butyl cellosolve and other cellosolve solvents; esters such as butyl acetate; ketones such as dibutyl ketone; aliphatic hydrocarbons (liquid paraffins) such as pentane; alicyclic hydrocarbons such as cyclohexane; aromatic hydrocarbons such as xylene; halogenated hydrocarbons such as methylene chloride; aromatic heterocyclic compounds such as pyridine; nitriles such as acetonitrile; amides such as N,N-dimethylformamide; carboxylic acid salts; and silicone oil and other oils. One or a mixture of such substances can be used.

Preferably, the dispersion medium 7 is mainly composed of, among others, an aliphatic hydrocarbon (liquid paraffin) or silicone oil. Using a liquid paraffin or silicone oil as the main ingredient makes the dispersion medium 7 hydrophobic and a harsh environment for the first and second particulate materials A and B to aggregate in. Such a dispersion medium therefore helps to effectively reduce or prevent the degradation of the display characteristics of the display apparatus 20 over time. Furthermore, liquid paraffins and silicone oil have no unsaturated bonds and thus are highly safe and remarkably weather-resistant.

The detailed constitution of the display apparatus 20 is as described above. Configured in such a way, the display apparatus 20 offers reduced voltage drops between the electrodes 3 and 4 owing to the low resistivity of the electrode protection layer 14. The apparatus thus operates with low power consumption without corrosive degradation of the first electrode 3. Since the distal end portion of the partition structure 9 is embedded in the adhesive layer 13, the substrate 12 and the partition structure 9 are firmly joined and the mechanical strength (in particular, strength against bending) of the apparatus is improved. The tight adhesion between the substrate 12 and the partition structure 9 ensures that each section S is separated from other sections S, preventing the first and second particulate materials A and B from migrating between adjacent sections S. As a result, the first and second particulate materials A and B are uniformly distributed across the display layer 400, and the apparatus exhibits excellent display characteristics.

Configured in such a way, the display apparatus 20 operates as follows, for example.

To show the color of the first particulate material

A voltage is applied between the first electrode 3 and the second electrode 4 to make the first electrode 3 at a negative potential and the second electrode 4 at a positive potential. The electric field generated by the application of voltage acts on the first and second particulate materials A and B in the display layer 400. The first particulate material A, which is negatively charged, migrates toward the second electrode 4 and collects on the second electrode 4 side, while the second particulate material B, which is positively charged, migrates toward the first electrode 3 and collects on the first electrode 3 side. As a result, the display surface 121 shows the color of the first particulate material A as illustrated in FIG. 4A.

To Show the Color of the Second Particulate Material

A voltage is applied between the first electrode 3 and the second electrode 4 to make the first electrode 3 at a positive potential and the second electrode 4 at a negative potential. The electric field generated by the application of voltage acts on the first and second particulate materials A and B in the display layer 400. The first particulate material A, which is negatively charged, migrates toward the first electrode 3 and collects on the first electrode 3 side, while the second particulate material B, which is positively charged, migrates toward the second electrode 4 and collects on the second electrode 4 side. As a result, the display surface 121 shows the color of the second particulate material B as illustrated in FIG. 4B.

The color to be shown is selected in such a way for each section S (pixel), and a desired image is shown on the display surface 121.

The following describes a method for producing the display apparatus 20.

A method for producing the display apparatus 20 includes forming a resin layer 90 mainly composed of an electroconductive polymer on a first electrode 3 on an opposite substrate 11, forming a plurality of depressions 901 in the resin layer 90 to integrally form a partition structure 9 separating a plurality of sections S and an electrode protection layer 14 covering the first electrode 3, filling the individual sections S with a liquid dispersion 100, and joining a substrate 12 to the partition structure 9 to seal the depressions 901. The details are as follows.

Figure 5A:
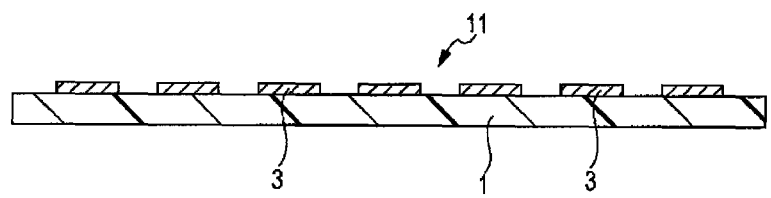
FIGS. 5A and 5B are cross-sectional diagrams used to describe a method for producing the display apparatus illustrated in FIG. 1.

1: An opposite substrate 11 is prepared as illustrated in FIG. 5A. A partition structure 9 and an electrode protection layer 14 are then formed together (integrally formed) on this opposite substrate 11.

Any method can be used to form the partition structure 9 and the electrode protection layer 14, and examples include patterning by photolithography and etching, printing processes such as screen printing, and imprinting (making projections and depressions by using a die). The following describes an imprinting process by way of illustration.

Figure 5B:
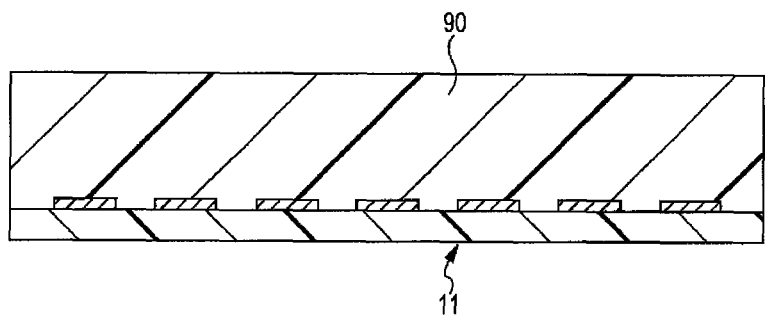

1-1: When an ultraviolet-curable polymer like the aforementioned ones is used to form the partition structure 9 and the electrode protection layer 14, the monomer and a polymerization initiator are dispersed in a solvent to form a coating solution (an ultraviolet-curable resin composition), and the prepared coating solution is applied to the opposite substrate 11. Then, the coating is dried until the solvent is removed, forming a resin layer 90 as illustrated in FIG. 5B.

Figure 6A:
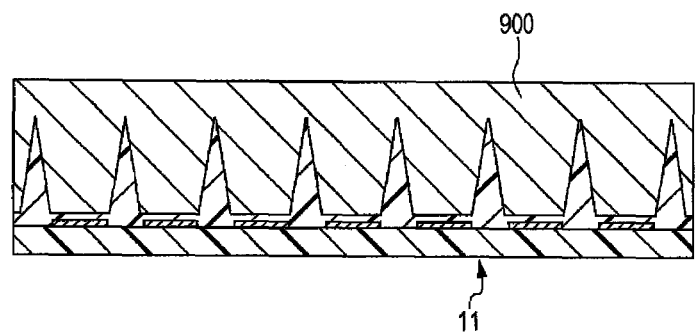
FIGS. 6A to 6C are cross-sectional diagrams used to describe the same method for producing the display apparatus illustrated in FIG. 1.
Figure 6B:
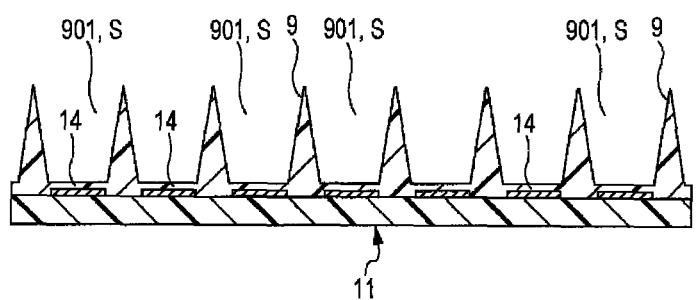

1-2: A die 900 is then pressed against the resin layer 90 to transfer the partition structure shape to the opposite substrate 11 (i.e., a plurality of depressions 901, which correspond to sections S, are formed in the resin layer 90) as illustrated in FIG. 6A. The resin layer 90 is then cured (hardened) by ultraviolet radiation. As a result, a partition structure 9 and an electrode protection layer 14 both of which are electroconductive are integrally formed as illustrated in FIG. 6B.

The thickness of the electrode protection layer 14 can be adjusted to a desired value in an easy and reliable way by controlling the clearance between the die 900 and the opposite substrate 11 while pressing the die 900.

Figure 6C:
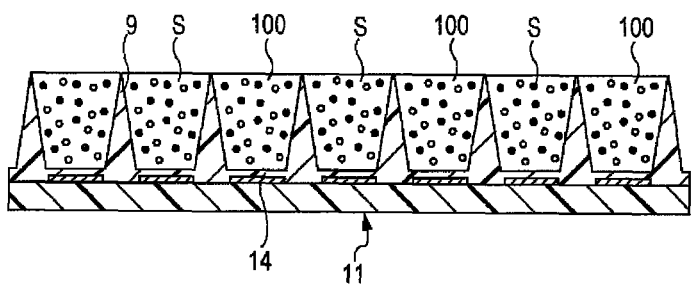

2: A liquid dispersion 100 is then filled into the individual sections S as illustrated in FIG. 6C.

Any method can be used to supply the liquid dispersion 100, and examples include ink jet processes.

3: An adhesive layer 13 is then formed on a substrate 12. Any method can be used to form the adhesive layer 13. In a typical method, the raw material (an adhesive resin) is dispersed in a solvent, the prepared coating solution is applied to the substrate 12 (the surface of a second electrode 4) to form a resin layer, and this resin layer is dried until the solvent is removed.

Examples of methods that can be used to apply the coating solution include gravure coating, comma coating, wire-bar coating, lip coating, die coating, screen printing, and ink jet processes.

Figure 7A:
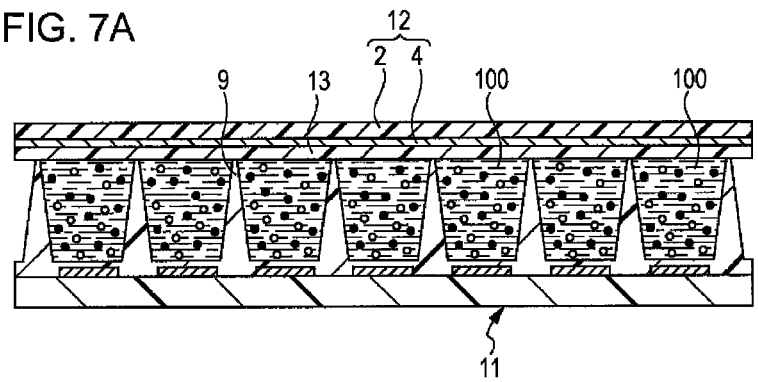
FIGS. 7A to 7C are cross-sectional diagrams used to describe the same method for producing the display apparatus illustrated in FIG. 1.

4: The substrate 12 is then placed on the display layer 400 with the adhesive layer 13 on the display layer 400 side as illustrated in FIG. 7A.

Figure 7B:
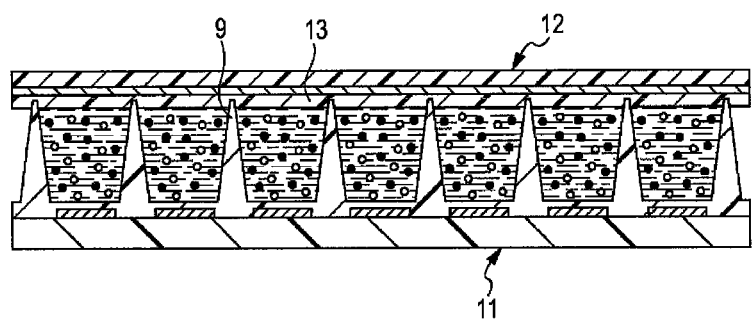

After the adhesive layer 13 is heated to a temperature on the order of 50 to 80° C. (the softening temperature of the adhesive layer 13 or higher) and thereby softened, the substrate 12 is pressed against the opposite substrate 11. As a result, the distal end portion of the partition structure 9 sticks into the adhesive layer 13 and is embedded in the adhesive layer 13 as illustrated in FIG. 7B.

Such a constitution increases the area of contact between the partition structure 9 and the adhesive layer 13 and thereby firmly joins the partition structure 9 and the adhesive layer 13. Any pressing method can be used, such as heat rolling. Heat rolling allows the adhesive layer 13 to be heated (softened) and the substrate 12 to be pressed against the opposite substrate 11 at the same time.

While the distal end portion of the partition structure 9 is getting into the adhesive layer 13, the portions of the liquid dispersion 100 adhering to the surface are removed by contact with the adhesive layer 13. This makes the interface between the partition structure 9 and the adhesive layer 13 in the adhesive layer 13 substantially free of the liquid dispersion 100 and thus also contributes to the tight attachment between these two components.

Figure 7C:
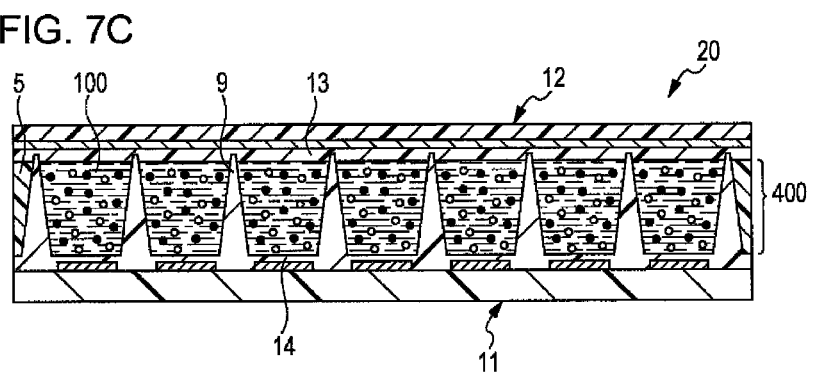

5: A seal 5 is then formed around the display layer 400 as illustrated in FIG. 7C. In this way, the display apparatus 20 is obtained.

By such a production method the display apparatus 20 can be reliably produced with the electrode protection layer 14 having a resistivity lower than that of the partition structure 9. Such a method also makes it possible to produce the display apparatus 20 with more ease and less work since the electrode protection layer 14 and the partition structure 9 are integrally formed. The resulting display apparatus 20, furthermore, has excellent mechanical strength owing to the tight attachment between the partition structure 9 and the substrate 12.

Embodiment 2

The following describes Embodiment 2 of the display apparatus according to the same aspect of the invention.

Figure 8:
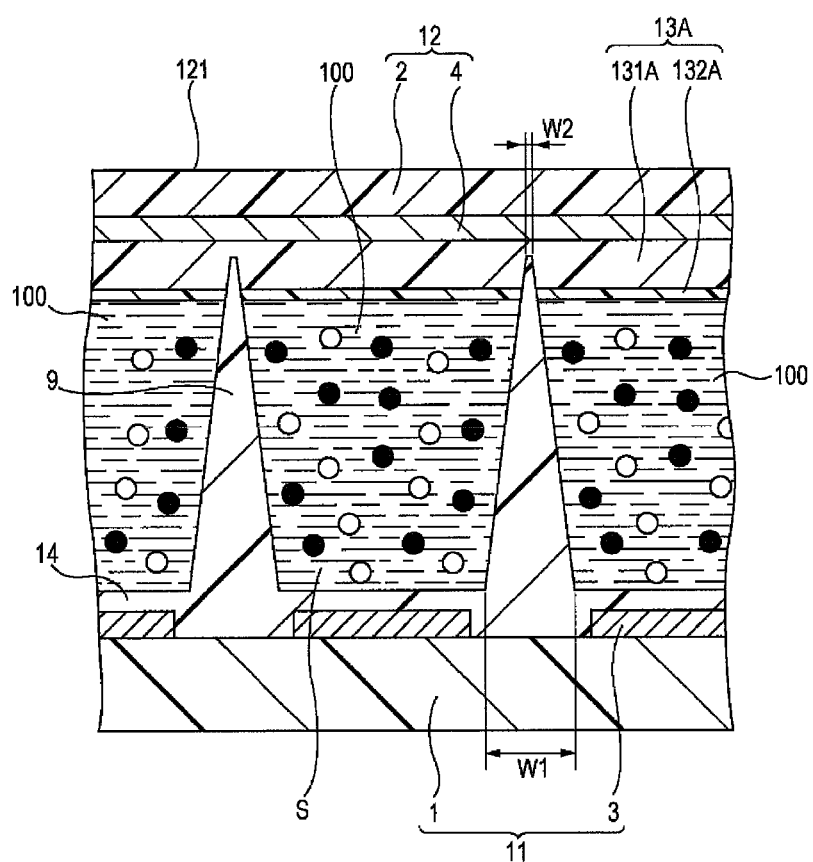
FIG. 8 is an enlarged partial cross-sectional diagram illustrating Embodiment 2 of the display apparatus according to an aspect of the invention.
Figure 9A:
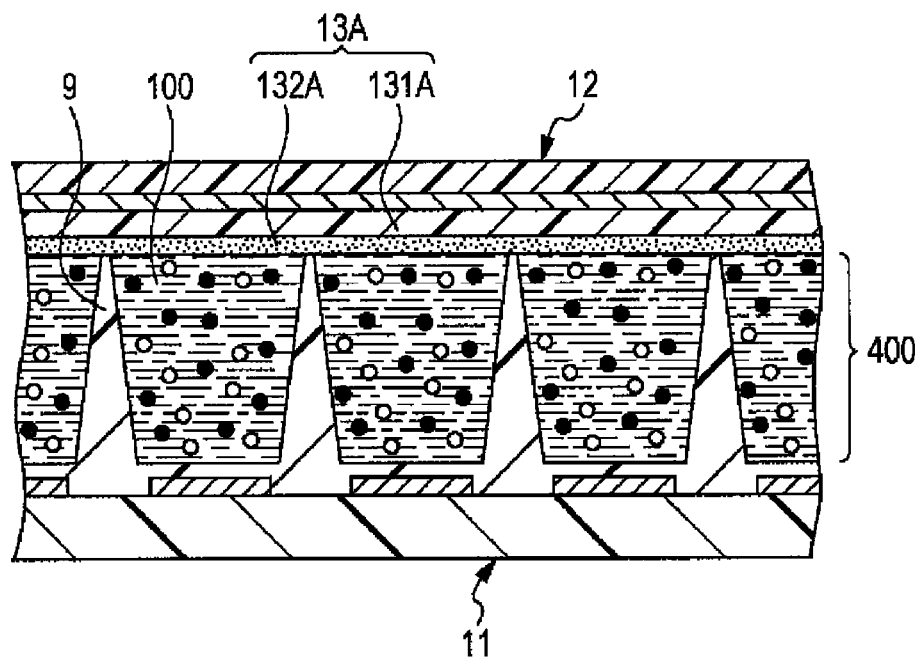
FIGS. 9A and 9B are cross-sectional diagrams used to describe a method for producing the display apparatus illustrated in FIG. 8.
Figure 9B:
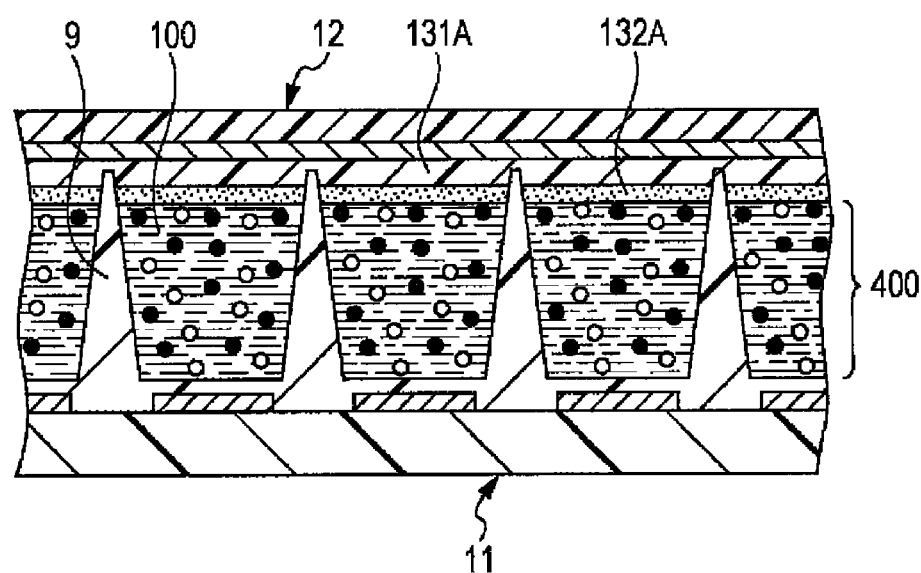

FIG. 8 is an enlarged partial cross-sectional diagram illustrating Embodiment 2 of the display apparatus according to this aspect of the invention. FIGS. 9A and 9B are cross-sectional diagrams used to describe a method for producing the display apparatus illustrated in FIG. 8.

The following description of Embodiment 2 focuses on the differences with the previous embodiment; the common features to the two embodiments will be omitted.

The display apparatus according to Embodiment 2 of this aspect of the invention is the same as that according to Embodiment 1 except for the constitution of the adhesive layer. The elements having the same constitution as in Embodiment 1 above are denoted by the same reference numerals as in that embodiment.

As illustrated in FIG. 8, the display apparatus 20 according to this embodiment has an adhesive laminate 13A that has a first adhesive layer 131A on the bottom surface of the substrate 12 and a second adhesive layer 132A on the bottom surface of the first adhesive layer 131A. In other words, the adhesive laminate 13A is composed of a first adhesive layer 131A and a second adhesive layer 132A stacked in this order from the substrate 12 side.

The first adhesive layer 131A is made of a thermoplastic material as with the adhesive layer 13 used in Embodiment 1 above. The constitution of the first adhesive layer 131A is the same as that of the adhesive layer 13 used in Embodiment 1 and is not described here.

The second adhesive layer 132A is harder than the first adhesive layer 131A. Configured in such a way, the second adhesive layer 132A serves as a barrier to prevent the partition structure 9 and the first adhesive layer 131A from penetrating (flowing out) into the liquid dispersion 100 while these two components are softened during the production of the display apparatus 20. As a result, the liquid dispersion 100 is protected from contamination, making the display characteristics of the display apparatus more durable.

Preferably, the second adhesive layer 132A is made of a light-curable material such as an ultraviolet-curable material. This makes the second adhesive layer 132A not to be softened by heat and able to remain rigid even while the adhesive layer 131A and the partition structure 9 are softened by heat, more effectively preventing the partition structure 9 and the first adhesive layer 131A from penetrating into the liquid dispersion 100 while these two components are softened. Using a light-curable material, which needs no heat to cure, also prevents problems such as the first adhesive layer 131A being softened while the second adhesive layer 132A is cured. As a result, the adhesive laminate 13A can be formed in an easy and reliable way.

All kinds of light-curable (ultraviolet-curable) materials can be used in the second adhesive layer 132A. Examples include materials containing an ultraviolet polymerization initiator in resins that can be used to make the first adhesive layer 131A.

It is preferred that the Young's modulus of the material of the second adhesive layer 132A is higher than that of the material of the first adhesive layer 131A and lower than that of the material of the partition structure 9. More specifically, when the Young's modulus of the material of the first adhesive layer 131A is in the range of 0.01 MPa to 50 MPa, both inclusive, and that of the material of the partition structure 9 is in the range of 500 MPa to 10 GPa, both inclusive, for example, the Young's modulus of the material of the second adhesive layer 132A is preferably more than 50 MPa and less than 500 MPa.

A more specific description of a production benefit of this embodiment is as follows. As illustrated in FIG. 9A, an opposite substrate 11 having a partition structure 9 and a display layer 400 and a substrate 12 having an adhesive laminate 13A are stacked in the same way as in Embodiment 1 above. The second adhesive layer 132A has already been cured by ultraviolet radiation. The adhesive laminate 13A is then heated so that the first adhesive layer 131A should be softened. The second adhesive layer 132A, which is not softened by heat, remains rigid, preventing the first adhesive layer 131A from penetrating into the liquid dispersion 100. The substrate 12 and the opposite substrate 11 are then pressed against each other. This makes the distal end portion of the partition structure 9 break through the surface of the adhesive laminate 13A (the second adhesive layer 132A) and stick into the adhesive laminate 13A. As a result, the partition structure 9 and the adhesive laminate 13A are firmly joined.

Configured in such a way, Embodiment 2 has similar effects to Embodiment 1 above.

The display apparatus 20, configured in such a way as described above, can be incorporated in a wide range of electronic devices. Examples of the electronic device according to an aspect of the invention, which is provided with an electrophoretic display apparatus, include electronic paper displays, e-book readers, televisions, video tape recorders with a viewfinder or a direct-view monitor, automotive navigation systems, pagers, electronic organizers, calculators, electronic newspaper readers, word processors, personal computers, workstations, videophones, POS terminals, and touch-screen devices.

Among such electronic devices, the following describes an electronic paper display by way of a specific example of this aspect of the invention.

FIG. 10 is a perspective diagram illustrating an electronic paper display as an embodiment of the electronic device according to this aspect of the invention.

The electronic paper display 600 illustrated in FIG. 10 has a main body 601 that is a rewritable sheet having paper-like texture and flexibility and a screen unit 602. The electronic paper display 600, configured in such a way, has a display apparatus like the above-described display apparatus 20 as the display unit 602.

The following describes a screen as another embodiment of the electronic device according to this aspect of the invention.

Figure 11A:
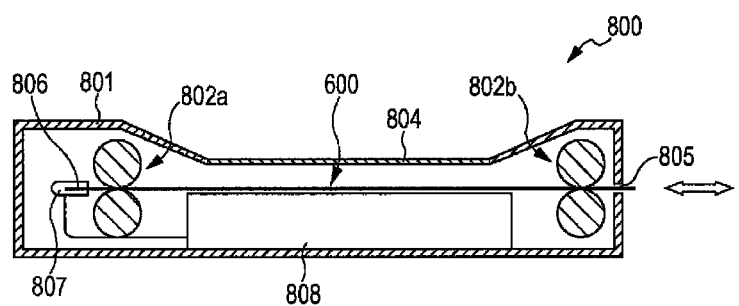
FIGS. 11A and 11B illustrate a screen as another embodiment of the electronic device according to an aspect of the invention.
Figure 11B:
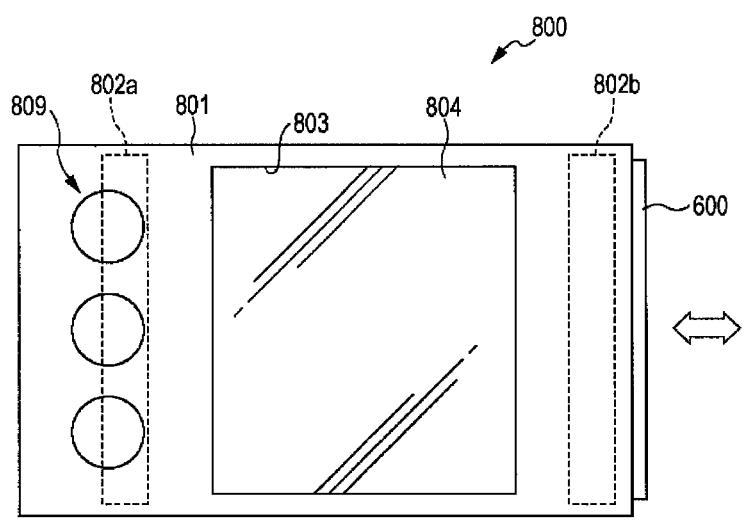

FIGS. 11A and 11B illustrate a screen as one embodiment of the electronic device according to this aspect of the invention. FIG. 11A is a cross-sectional view, while FIG. 11B is a plan view.

The screen (display apparatus) 800 illustrated in FIGS. 11A and 11B has a main unit 801 and an electronic paper display 600 removably installed in this main unit 801. The constitution of this electronic paper display 600 is the same as that of the above one, i.e., the constitution illustrated in FIG. 10.

The main unit 801 has on a side thereof (the right-hand side in FIG. 11A) a slot 805 through which the electronic paper display 600 can be inserted, and also contains two pairs of transport rollers 802a and 802b. Once the electronic paper display 600 is inserted into the main unit 801 through the slot 805, the pairs of transport rollers 802a and 802b pinch the electronic paper display 600 and place it in the main unit 801.

The main unit 801 also has a rectangular opening 803 on the display surface side (the front side of FIG. 11B), and this opening 803 holds a transparent glass sheet 804. This constitution allows the electronic paper display 600 installed in the main unit 801 to be seen from the outside of the main unit 801. In other words, this screen 800 provides a display surface by showing the electronic paper display 600 installed in the main unit 801 through the transparent glass sheet 804.

Furthermore, the electronic paper display 600 has a terminal section 806 near the leading end with respect to the direction of insertion (the left-hand side in FIG. 11A), and the main unit 801 has a built-in socket 807 into which the electronic paper display 600 in the main unit 801 is plugged at the terminal section 806. A controller 808 and a control unit 809 are electrically connected to this socket 807.

This screen 800, configured in such a way, in which the electronic paper display 600 is removably installed in the main unit 801, allows the paper display to be taken out of the main unit 801 and used standalone. This improves convenience for the user.

While the foregoing describes the display sheet, the method for producing a display sheet, the display apparatus, and the electronic device according to aspects of the invention on the basis of the embodiments illustrated in the attached drawings, the present invention is not limited to these embodiments. The individual elements may be replaced with other equivalent elements. It is also allowed to modify any aspect of the invention with additional components. Furthermore, the above embodiments can be combined where necessary.

Although in the above embodiments the partition structure 9 is in a grid pattern, this is not the only possible shape of the partition structure 9 (in a plan view). For example, this structure can be in a honeycomb pattern or consist of a plurality of partition walls extending in the X-direction and arranged at intervals in the Y-direction. The former leads to enhanced mechanical strength, whereas the latter an increased aperture ratio.

This application claims the benefit of Japanese Patent Application No. 2012-106090, filed on May 7, 2012, which is hereby incorporated by reference as if fully set forth herein.

What is claimed is:

1. A display sheet comprising:
 a display layer;
 a first electrode on one side of the display layer;
 a second electrode on another side of the display layer; and
 an electrode protection layer between the display layer and the first electrode, wherein:
 the display layer has a partition structure dividing the display layer into a plurality of regions and a liquid dispersion of at least one positively or negatively charged particulate material in a dispersion medium and filling each of the plurality of regions; and
 the electrode protection layer and the partition structure are integrally formed and both mainly composed of an electroconductive polymer, wherein the electroconductive polymer is an ultraviolet-curable polymer having an ethylene oxide side chain.

2. The display sheet according to claim 1, wherein the ethylene oxide side chain is a group represented by a chemical formula $(CH_2-CH_2-O-)_n-$ where the subscript n is an integer of 2 to 20.

3. The display sheet according to claim 1, further comprising an adhesive layer between the display layer and the second electrode.

4. The display sheet according to claim 3, wherein a distal end portion of the partition structure is embedded in the adhesive layer.

5. The display sheet according to claim 3, wherein the adhesive layer is made of a thermoplastic material.

6. The display sheet according to claim 1, wherein the partition structure is tapered, getting narrower toward a distal end thereof.

7. A method for producing a display sheet having a display layer, a first electrode on one side of the display layer, and a second electrode on another side of the display layer, comprising:
- forming a resin layer mainly composed of an electroconductive polymer on the first ethylene, wherein the electroconductive polymer is an ultraviolet-curable polymer having an ethylene oxide side chain;
- forming a plurality of depressions in the resin layer to integrally form a partition structure separating a plurality of regions and an electrode protection layer covering the first electrode;
- filling each of the plurality of regions with a liquid dispersion of at least one positively or negatively charged particulate material in a dispersion medium; and
- forming the second electrode above the partition structure to seal the depressions.

8. The method for producing a display sheet according to claim 7, wherein the partition structure and the electrode protection layer are formed by pressing a die having a plurality of projections against the resin layer.

9. The method for producing a display sheet according to claim 7, wherein the partition structure and the second electrode are joined using an adhesive layer.

10. The method for producing a display sheet according to claim 9, wherein the partition structure and the second electrode are joined by pressing the partition structure against the adhesive layer to stick a distal end portion of the partition structure into the adhesive layer.

11. The method for producing a display sheet according to claim 10, wherein the adhesive layer is softened before the partition structure and the second electrode are joined.

12. A display apparatus comprising the display sheet according to claim 1.

13. A display apparatus comprising the display sheet according to claim 2.

14. A display apparatus comprising the display sheet according to claim 3.

15. A display apparatus comprising the display sheet according to claim 4.

16. A display apparatus comprising the display sheet according to claim 5.

17. A display apparatus comprising the display sheet according to claim 6.

18. An electronic device comprising the display apparatus according to claim 12.

* * * * *